United States Patent
Yamada et al.

(10) Patent No.: US 10,269,131 B2
(45) Date of Patent: Apr. 23, 2019

(54) IMAGE PROCESSING APPARATUS AND IMAGE PROCESSING METHOD

(71) Applicant: Kabushiki Kaisha Toshiba, Minato-ku, Tokyo (JP)

(72) Inventors: Yutaka Yamada, Fuchu Tokyo (JP); Toru Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 15/191,690

(22) Filed: Jun. 24, 2016

(65) Prior Publication Data

US 2017/0076460 A1 Mar. 16, 2017

Related U.S. Application Data

(60) Provisional application No. 62/216,602, filed on Sep. 10, 2015.

(51) Int. Cl.
*G06T 7/593* (2017.01)

(52) U.S. Cl.
CPC .................................. *G06T 7/593* (2017.01)

(58) Field of Classification Search
CPC ... G06T 2207/10012; G06T 7/55; G06T 7/50; G06T 7/593; G06T 2207/10028; G06T 2207/20228
See application file for complete search history.

(56) References Cited

U.S. PATENT DOCUMENTS

| 8,427,524 | B2 | 4/2013 | Jeong et al. | |
| 8,634,637 | B2 * | 1/2014 | Hirschmueller | G06T 7/593 382/154 |
| 9,524,556 | B2 * | 12/2016 | Uliyar | H04N 13/232 |
| 2012/0002866 | A1 * | 1/2012 | Hirschmueller | G06T 7/593 382/154 |
| 2012/0194652 | A1 | 8/2012 | Myokan et al. | |
| 2013/0083993 | A1 * | 4/2013 | Sutou | G06T 7/97 382/154 |
| 2013/0083994 | A1 * | 4/2013 | Ren | G06T 7/0075 382/154 |
| 2015/0030204 | A1 | 1/2015 | Lee et al. | |
| 2015/0248594 | A1 * | 9/2015 | Zhong | B60R 11/04 382/195 |

(Continued)

FOREIGN PATENT DOCUMENTS

| JP | 4991873 B2 | 8/2012 |
| JP | 2012-177676 A | 9/2012 |
| JP | 2015-028780 A | 2/2015 |

*Primary Examiner* — Carol Wang
(74) *Attorney, Agent, or Firm* — White & Case LLP (57) ABSTRACT

According to one embodiment, an image processing apparatus is provided with a first arithmetic unit, a second arithmetic unit, a third arithmetic unit, and a search unit. The first arithmetic unit calculates a first cost function. The first cost function represents a relation between a disparity value and a cost in a search range of a second image. The second arithmetic unit calculates a second cost function. The second cost function is a sum of first cost functions regarding a plurality of paths. The third arithmetic unit calculates a representative value of intermediate data. The intermediate data is an addition result of first cost functions regarding a first path group among the plurality of paths.

19 Claims, 8 Drawing Sheets

(56) References Cited

U.S. PATENT DOCUMENTS

| | | | |
|---|---|---|---|
| 2015/0279045 A1* | 10/2015 | Zhong | G06K 9/6212 |
| | | | 382/154 |
| 2016/0129906 A1* | 5/2016 | Chen | B60W 30/08 |
| | | | 701/70 |
| 2016/0227237 A1* | 8/2016 | Kwon | G06T 7/593 |
| 2017/0272723 A1* | 9/2017 | Ren | H04N 13/239 |

* cited by examiner

IMAGE PROCESSING APPARATUS AND IMAGE PROCESSING METHOD

CROSS-REFERENCE TO RELATED APPLICATIONS

This application is based upon and claims the benefit of priority from U.S. Provisional Application No. 62/216,602, filed on Sep. 10, 2015; the entire contents of which are incorporated herein by reference.

FIELD

Embodiments described herein relate generally to an image processing apparatus and an image processing method.

BACKGROUND

A semi-global matching (SGM) is a type of stereo matching methods of obtaining distance information from two or more images. There is an image processing apparatus which stores intermediate data including information calculated for each pixel of an input image during steps until a corresponding point with the pixel of the input image is searched from a reference image. In the case of the SGM, the image processing apparatus obtains a cost of a disparity using information of a target pixel in the input image, and information of a periphery of the target pixel. In the SGM, a size of the intermediate data to be transferred and held between steps is large.

DETAILED DESCRIPTION

In general, according to one embodiment, an image processing apparatus is provided with a first arithmetic unit, a second arithmetic unit, a third arithmetic unit, and a search unit. The first arithmetic unit calculates a first cost function in a first image and a second image using the first image as a reference. The first image and the second image are acquired by being photographed from different viewpoints. The first cost function represents a relation between a disparity value and a cost in a search range of a corresponding point of the second image with a target pixel of the first image. The cost is a result of evaluating a degree of difference between pixel data of the target pixel and pixel data of the disparity value. The first cost function depends on a cost of a pixel on a path heading toward a target pixel. The second arithmetic unit calculates a second cost function. The second cost function is a sum of first cost functions regarding a plurality of paths heading toward the target pixel. The third arithmetic unit calculates a representative value of intermediate data with respect to pixels included in a pixel block of the first image. The intermediate data is an addition result of first cost functions regarding a first path group among the plurality of paths. The search unit searches a disparity value that represents the corresponding point from the second cost function.

Exemplary embodiments of an image processing apparatus and an image processing method will be explained below in detail with reference to the accompanying drawings. The present invention is not limited to the following embodiments.

First Embodiment

Figure 1:
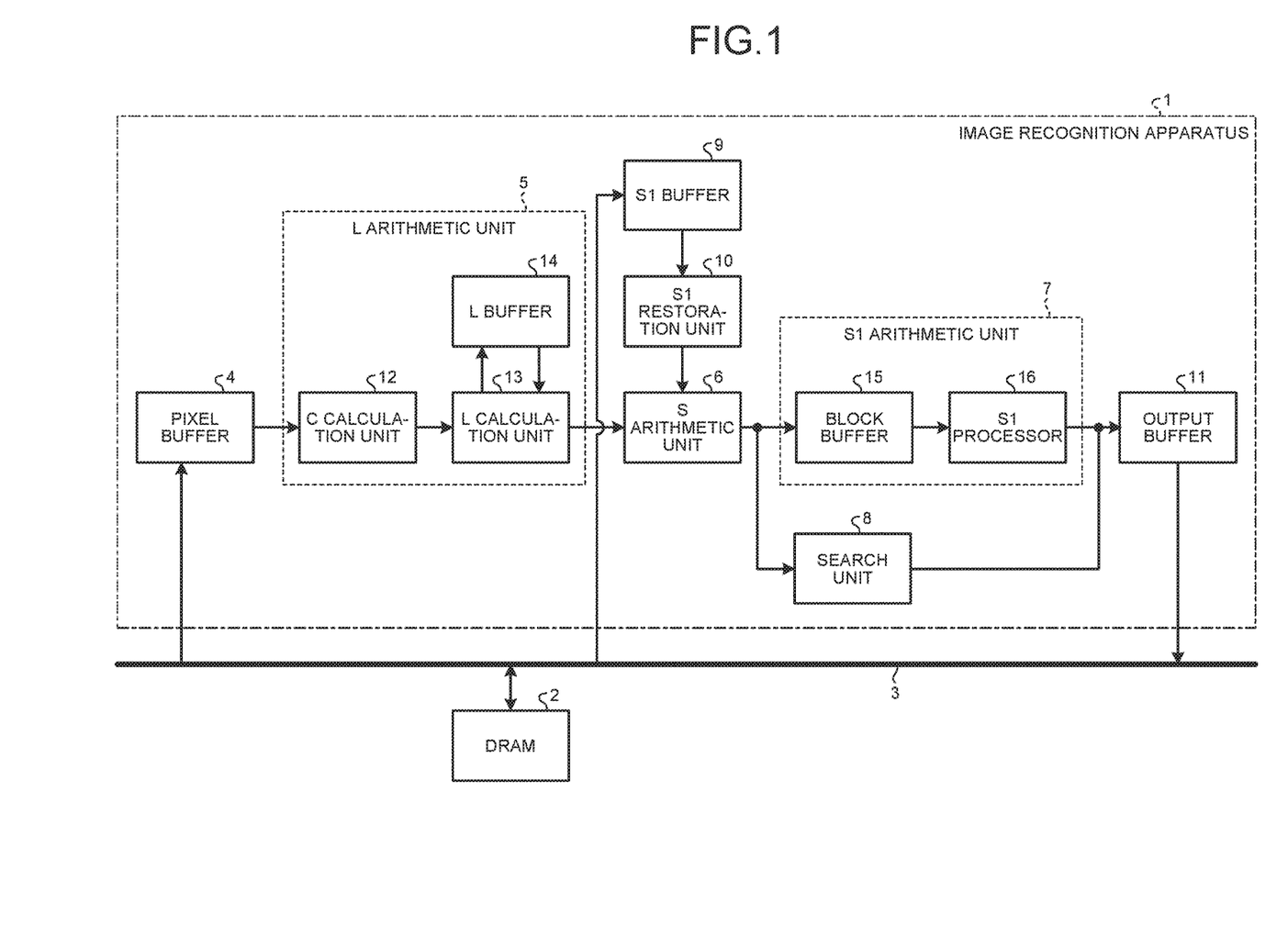
FIG. 1 is a block diagram of an image recognition system that includes an image recognition apparatus which is an image processing apparatus of a first embodiment.

FIG. 1 is a block diagram of an image recognition system that includes an image recognition apparatus which is an image processing apparatus of a first embodiment. The image recognition system executes stereo matching processing in order to obtain distance information of a subject from images photographed from viewpoints different from each other. The image recognition system is provided with an image recognition apparatus 1, a dynamic random access memory (DRAM) 2 and a bus 3.

The DRAM 2 is an external memory of the image recognition apparatus 1. The DRAM 2 temporarily holds data to be processed by the image recognition apparatus 1. The bus 3 is a transmission path of data between the image recognition apparatus 1 and the DRAM 2.

An image processing program for realizing the image processing method according to the present embodiment is installed to a computer which is hardware. The computer is provided with an arithmetic device, a storage device and an input/output interface. The arithmetic device is a central processing unit (CPU). The storage device is configured of a read only memory (ROM), a random access memory (RAM), an external storage device, and the like.

The arithmetic device executes various programs based on a program stored in the ROM or the like. The hardware to which the image processing program is installed functions as the image processing apparatus. FIG. 1 illustrates various functional units of the image recognition apparatus 1 to be realized using the hardware configuration of the computer.

Pixel data of an input image, which is a first image, and pixel data of a reference image, which is a second image, are input to the image recognition apparatus 1. The input image and the reference image are images photographed from viewpoints different from each other including the common subject. The pixel is a constitutional unit of an image. The pixel data is image information to be specified for each pixel.

The image recognition apparatus 1 searches a corresponding point which corresponds to a target pixel in the input image from the reference image. The image recognition apparatus 1 obtains distance information regarding a point represented as the target pixel in the input image based on a disparity value of the corresponding point. The disparity value represents a deviation amount between the target pixel in the input image and a reference pixel in the reference image.

A pixel buffer 4 temporarily holds the pixel data of the input image and the pixel data of the reference image input to the image recognition apparatus 1. An L arithmetic unit 5, which is a first arithmetic unit, calculates a cost function L(d) which is a first cost function. The L arithmetic unit 5 is provided with a C calculation unit 12, an L calculation unit 13 and an L buffer 14. An S arithmetic unit 6, which is a second arithmetic unit, calculates a cost function S(d) which is a second cost function.

An S1 arithmetic unit 7, which is a third arithmetic unit, calculates a representative value of the intermediate data which is an addition result of the cost functions L(d) The S1 arithmetic unit 7 is provided with a block buffer 15 and an S1 processor 16. The S1 arithmetic unit 7 calculates the representative value for each pixel block of the reference image. The S1 buffer 9 temporarily holds the calculated representative value. An S1 restoration unit 10 restores the intermediate data of a pixel of a pixel block from the representative value.

A search unit 8 searches the disparity value that represents the corresponding point from the cost function S(d). An output buffer 11 temporarily holds the representative value calculated by the S1 arithmetic unit 7 and the disparity value which is a search result in the search unit 8.

Figure 2:
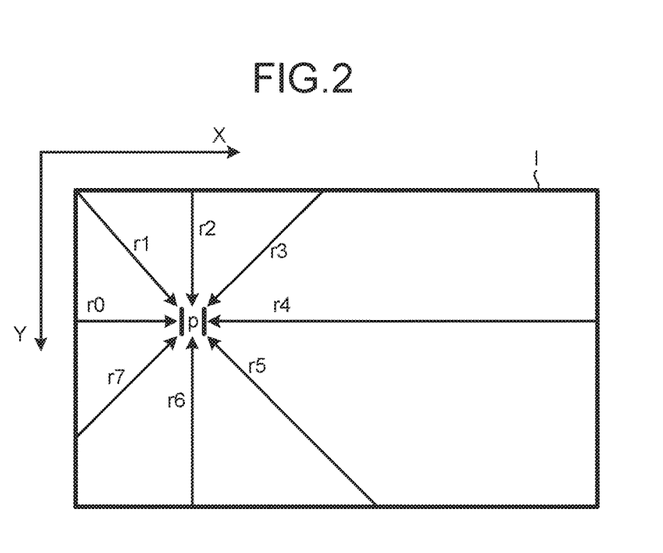
FIG. 2 is a diagram illustrating a plurality of paths from which a first cost function is calculated in an image processing method of the first embodiment.

Next, a description will be given regarding an outline of the search of the disparity value according to the first embodiment. FIG. 2 is a diagram illustrating a plurality of paths from which the cost functions L(d) are calculated in the L arithmetic unit 5.

The target pixel is a pixel set as a target among an input image I from which the corresponding point in the reference image is searched. In the first embodiment, the image recognition apparatus 1 is configured to search the corresponding point with the target pixel regarding a disparity in a horizontal direction (row direction).

The image recognition apparatus 1 evaluates a degree of difference between pixel data of a pixel p(x, y) of the input image I and pixel data of a reference pixel (x+d, y) of the reference image, and obtains a relation between a disparity value "d" and a cost. The image recognition apparatus 1 obtains the disparity value with which the cost is a minimum in a cost function $S_p(d)$ regarding the pixel p. The cost function $S_p(d)$ represents the cost function S(d) of the pixel p. The obtained disparity value represents the deviation amount between the pixel p and the corresponding point.

The X direction is set to a pixel row direction. The Y direction is set to a pixel column direction. In FIG. 2, a direction of the X direction indicated by an arrow is set to a positive Y direction, and a direction opposite to the arrow is set to a negative direction. A direction of the Y direction. indicated by an arrow is set to a positive Y direction, and a direction opposite to the arrow is set to a negative Y direction. There is a disparity in the X direction between the input image I and the reference image.

The L arithmetic unit 5 obtains $L_{r0,p}(d)$, $L_{r1,p}(d)$, ..., $L_{r7,p}(d)$ which are cost functions regarding eight paths r0, r1, ..., r7 heading toward the pixel p. The path r0 is the positive X direction. The path r1 is a direction of a diagonal between the positive X direction and the positive Y direction. The path r2 is the positive Y direction. The path r3 is a direction of a diagonal between the negative X direction and the positive Y direction. The path r4 is the negative X direction. The path r5 is a direction of a diagonal between the negative direction and the negative Y direction. The path r6 is the negative Y direction. The path r7 is a direction of a diagonal between the positive X direction and the negative Y direction.

Incidentally, the number of paths is not limited to eight, and it may be enough when a plurality of paths are provided. The path may be provided as, for example, four paths in the X direction and the Y direction, 16 paths, or the like it may be enough when the plurality of paths are set to have dependency that is hardly processed by any one between a first pass (1st pass) and a second pass (2nd pass) to be described later.

Figure 3:
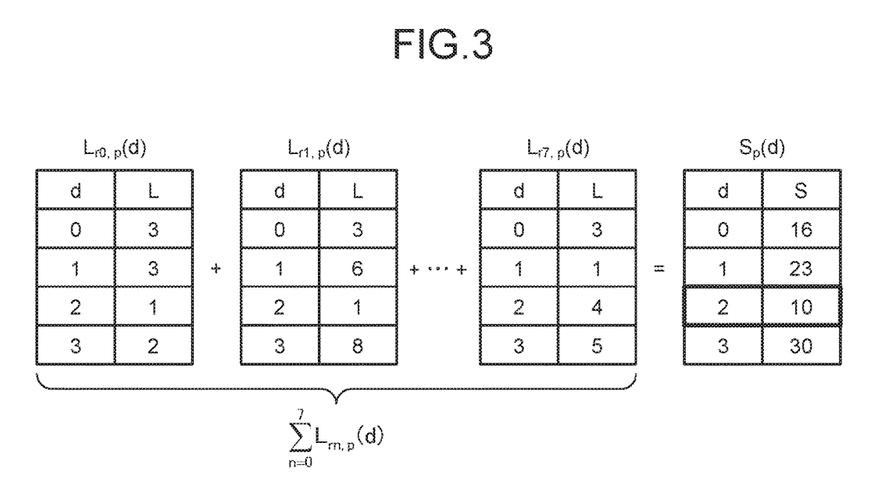
FIG. 3 is a diagram describing calculation of a second cost function and search of a disparity value in the image processing method of the first embodiment.

FIG. 3 is a diagram describing calculation of the cost function S(d) in the S arithmetic unit 6 and search of the disparity value. A cost function $L_{r0,p}(d)$ represents a relation between the disparity value "d" and a cost "L" in the search range of the corresponding point with the target pixel of the reference image.

In the first embodiment, the search range is set to a range with the disparity value "d" being 0 to 255. When d=0, it represents the same position as the pixel p. When d=255, it represents a position which is moved, by 255 pixels from the same position as the pixel p in the X direction. The image recognition apparatus 1 obtains one of the 256 disparity values "d" as a search result.

Incidentally, the search range is not limited to the range with the disparity value "d" being 0 to 255. The search range may be a range narrower or wider than "from 0 to 255". The search range may be a range including the disparity value "d" of a negative value. For example, the search range may be a range with the disparity value "d" being −128 to 127.

The cost function $L_{r0,p}(d)$ is created as a cost table in which the disparity value d (=0, 1, ..., 255) and the cost. "L" are associated with each other. The cost "L" is a result of evaluating the degree of difference between data of the target pixel, and the pixel data of the reference pixel at a position of the disparity value "d". The cost "L" is a cost including a directional dependence. The directional dependence represents that a cost "L" of the pixel p is obtained by arithmetic including a cost "L" of a pixel neighboring on the pixel p in the corresponding direction.

Figure 4:
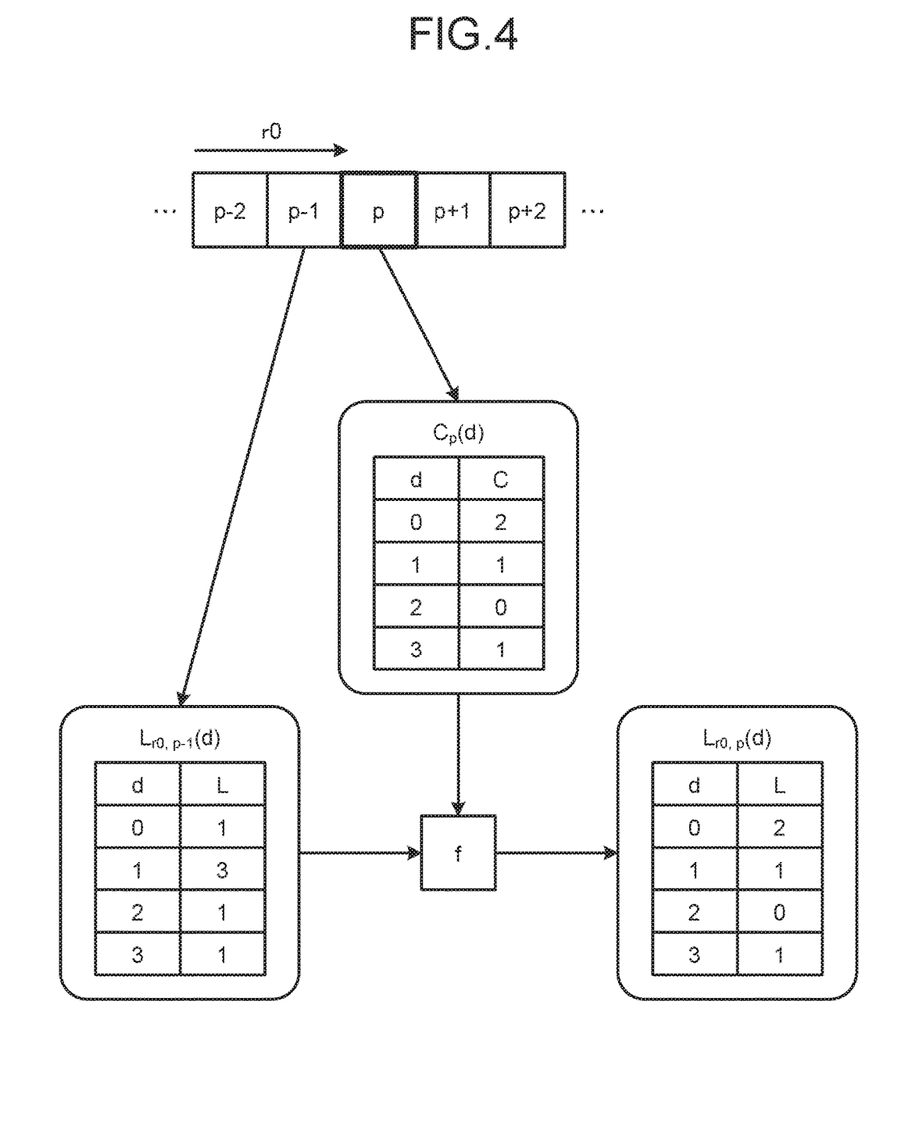
FIG. 4 is a diagram describing calculation of the first cost function in the image processing method of the first embodiment.

FIG. 4 is a diagram describing calculation of the cost function L(d) in the L arithmetic unit 5. The C calculation unit 12 calculates $C_p(d)$, which is a local cost function of the pixel p. A cost function $C_p(d)$ represents a relation between the disparity value "d" and a cost "C" of the pixel p. The cost. "C" is a local cost that does not include the directional dependence. The C calculation unit 12 obtains the cost "C" using a method of local binary pattern (LEE) or sum of absolute difference (SAD).

The L calculation unit 13 calculates the cost function $L_{r0,p}(d)$ regarding the path r0 by the following Expression (1).

$$L_{r0,p}(d) = C_p(d) + f(L_{r0,p-1}(d)) \qquad (1)$$

The cost function $L_{r0,p-1}(d)$ is a cost function regarding a pixel p−1. The pixel p−1 is a pixel immediately prior to the pixel p in the path r0. The L buffer 14 holds $L_{r0,p-1}(d)$ calculated by the L calculation unit 13 before the arithmetic processing regarding $L_{r0,p}(d)$. The L calculation unit 13 substitutes(d) obtained by the C calculation unit 12 and $L_{r0,p-1}(d)$ read by the L buffer 14 in Expression (1).

A function f(d)) is a function including $L_{r0,p-1}(d)$ as a parameter. The function $f(L_{r0,p-1}(d))$ is a function, for example, that selects a minimum value among $L_{r0,p-1}(d)$ $L_{r0,p-1}(d-1)$, $L_{r0,p-1}(d+1)+P1$, and $(d\pm n)+P2$. Values P1 and P2 are predetermined penalty values. Value n is an integer equal to or larger than 2. In this manner, the L calculation unit 13 calculates the cost function $L_{r0,p}(d)$ which depends on $L_{r0,p-1}(d)$ of the pixel p−1 on the path r0.

The L calculation unit 13 calculates $L_{r0,p}(d), \ldots, L_{r7,p}(d)$ regarding the paths r1 to r7 similar to the case of the path r0. The S arithmetic unit 6 calculates $S_p(d)$ which is an addition result of $L_{r0,p}(d), \ldots, L_{r7,p}(d)$ regarding the paths r0 to r7. The S arithmetic unit 6 calculates $S_p(d)$. A cost function $S_p(d)$ is represented by the following Expression (2).

$$S_p(d) = \sum_{n=0}^{7} L_{m,p}(d) \qquad (2)$$

The cost function $S_p(d)$ represents a relation between the disparity value "d" and a sum "S" of costs of the pixel p. In the first embodiment, a fact that the sum "S" is small represents that the degree of difference between the pixel data of the target pixel and the pixel data of the disparity value is low.

The search unit 8 searches a disparity value "d" with which the sum "S" is the minimum from $S_p(d)$ In the example illustrated in FIG. 3, the search unit 8 obtains the search result of "2", which is the disparity value "d" when the sum. "S" is the minimum value of "10" in the search range. The image recognition apparatus 1 obtains a disparity value with which the sum of costs is the minimum in the cost function S(d) regarding each pixel of the input image using the same method.

Figure 5:
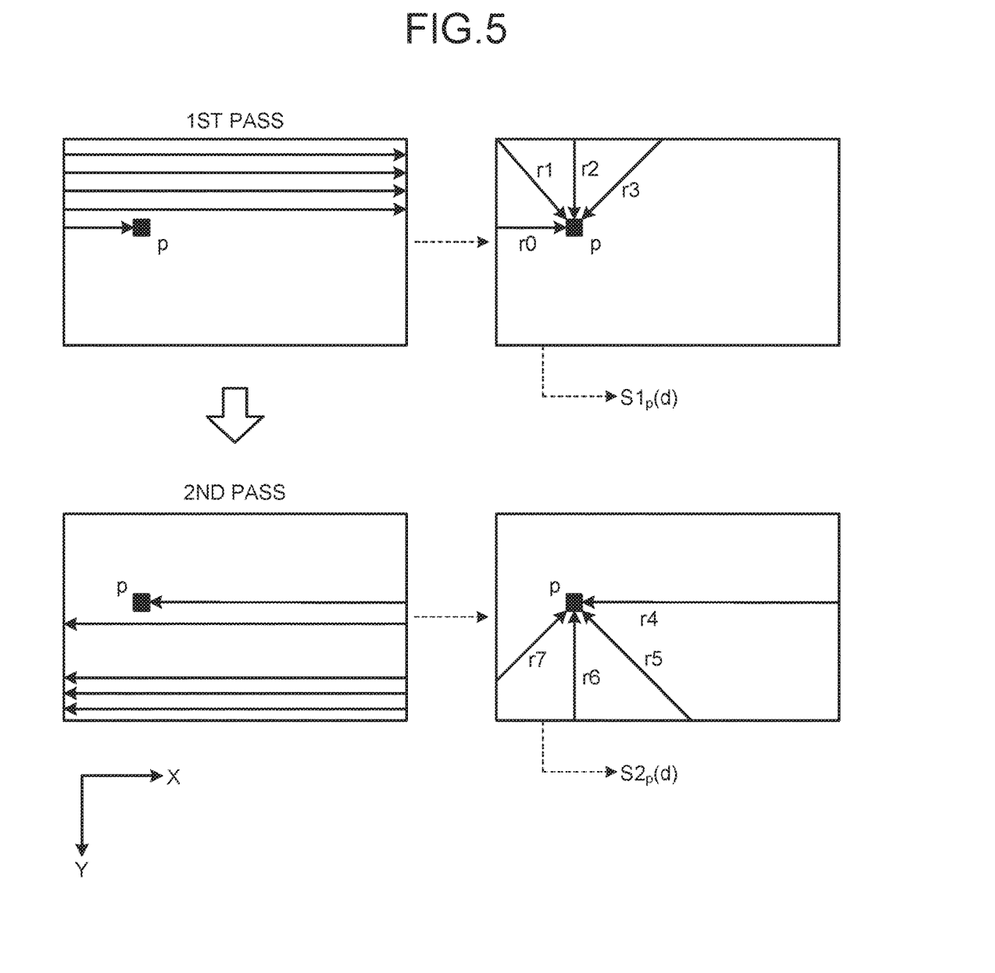
FIG. 5 is a diagram describing procedures of the calculation of the first cost function and the second cost function in the image processing method of the first embodiment.

FIG. 5 is a diagram describing procedures of the calculation of the cost function in the L arithmetic unit 5 and the S arithmetic unit 6. The L arithmetic unit 5 sequentially selects a pixel column of the input image from a negative Y-side toward the positive Y direction during the first pass (1st pass) and at the same time, scans pixel data of the selected pixel column from a negative X-side to the positive X direction.

The L arithmetic unit 5 calculates the cost functions $L_{r0}(d)$, $L_{r1}(d)$, $L_{r2}(d)$, and $L_{r3}(d)$ regarding the four paths r0, r1, r2, and r3, which belong to a first path group, for each pixel of the input image by scanning the pixel data during the first pass. When $L_{r0}(d)$, $L_{r1}(d)$, $L_{r2}(d)$, and $L_{r3}(d)$ are calculated with respect to a target pixel, the S arithmetic unit. 6 calculates $S1(d)$ regarding the target pixel. The cost function $S1(d)$ represents a relation between the disparity value "d" and a sum "S1" of costs regarding the first path group.

The cost function $S1(d)$ is an addition result of $L_{r0}(d)$, $L_{r1}$, $L_{r2}(d)$, and $L_{r0}(d)$ regarding the paths r0 to r3, and the intermediate data to be obtained in the process until calculating S(d). The S arithmetic unit 6 calculates $S1_p(d)$ regarding the pixel p by Expression (3).

$$S1_p(d) = L_{r0,p}(d) + L_{r1,p}(d) + L_{r2,p}(d) + L_{r3,p}(d) \qquad (3)$$

The L arithmetic unit 5 scans the pixel data of the input image along the second pass (2nd pass) after the intermediate data is obtained for each pixel of the input image. The L arithmetic unit 5 sequentially selects a pixel column of the input image from a positive Y-side toward the negative direction during the second pass, and at the same time, scans pixel data of the selected pixel column from a positive X-side to the negative X direction.

The L arithmetic unit 5 calculates the cost functions $L_{r4}(d)$ $L_{r5}(d)$, $L_{r6}(d)$, and $L_{r7}(d)$ regarding the four paths r4, r5, r6, and r7, which belong to a second path group, for each pixel of the input image by scanning the pixel data during the second pass. When $L_{r4}(d)$, $L_{r5}(d)$ $L_{r6}(d)$, and $L_{r7}(d)$ are calculated with respect to the target pixel, the S arithmetic unit 6 calculates $S2(d)$ regarding the target pixel. The cost function $S2(d)$ represents a relation between the disparity value "d" and a sum "S2" of costs regarding the second path group.

The cost function $S2(d)$ is an addition result of $L_{r4}(d)$, $L_{r5}(d)$, $L_{r6}(d)$, and $L_{r7}(d)$ regarding the paths r4 to r7 The S arithmetic unit 6 calculates $S2(d)$ regarding the pixel p by Expression (4).

$$S2_p(d) = L_{r4,p}(d) + L_{r5,p}(d) + L_{r6,p}(d) + L_{r7,p}(d) \qquad (4)$$

The S arithmetic unit 6 finally calculates $S_p(d)$ regarding the pixel p by adding $S1_p(d)$ and $S2_p(d)$.

Figure 6:
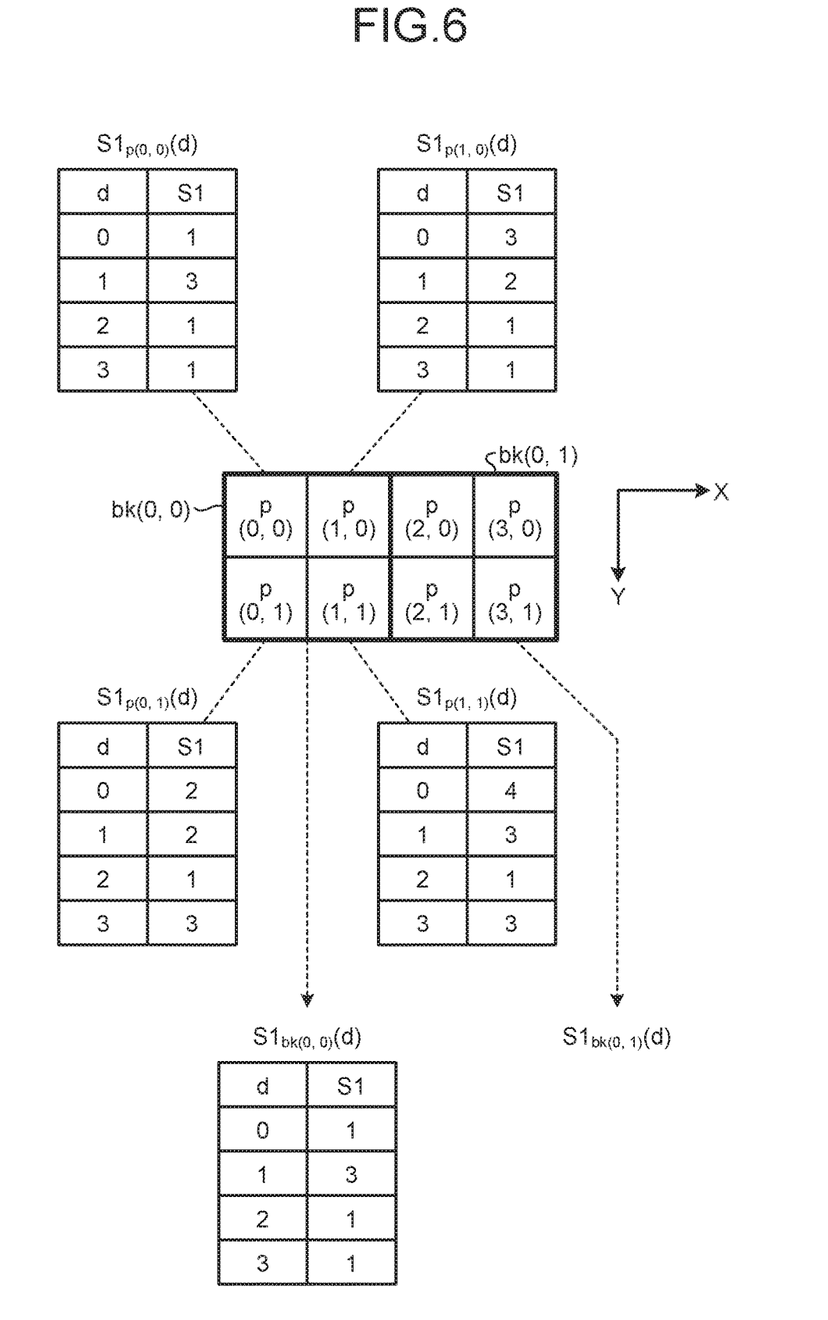
FIG. 6 is a diagram describing calculation of a representative value in a third arithmetic unit of the image recognition apparatus illustrated in FIG. 1.

FIG. 6 is a diagram describing calculation of the representative value in the S1 arithmetic unit 7. The S1 arithmetic unit 7 calculates a representative value $S1_{bk}(d)$ of $S1(d)$ which is the intermediate data calculated by the S arithmetic unit 6 for each pixel block of the input image. In the first embodiment, the pixel block includes four pixels. The four pixels form a matrix of 2×2. Incidentally, the pixel block is not limited to the block including the four pixels forming the matrix of 2×2. The number of pixels and a matrix of the pixel block can be set as appropriate.

In the first embodiment, the S1 arithmetic unit 7 sets the pixel block of 2×2 for the entire input image. In the first embodiment, the S1 arithmetic unit 7 applies the pixel block of 2×2, set in advance, regarding all the disparity values d=0, . . . , 255 of the search range.

A pixel block bk(0,0) illustrated in FIG. 6 is provided with four pixels p(0,0), p(10), p(0,1), and p(1,1). For example, p(0,0) represents a pixel with coordinate (0,0). The S arithmetic unit 6 calculates intermediate data $S1_{p(0,0)}(d)$, $S1_{p(1,0)}(d)$, $S1_{p(0,1)}(d)$, and $S1_{p(1,1)}(d)$ regarding the four pixels p(0,0), p(1,0),p(0,1), and p(1,1).

The block buffer 15 of the S1 arithmetic unit 7 holds $S1_{p(0,0)}(d)$, $S1_{p(1,0)}(d)$, $S1_{p(0,1)}(d)$, and $S1_{p(1,1)}(d)$. The S1 processor 16 reads $S1_{p(0,0)}(d)$, $S1_{p(1,0)}(d)$, $S1_{p(0,1)}(d)$, and $S1_{p(1,1)}(d)$ from the block buffer 15.

The S1 processor 16 determines a representative value $S1_{bk}(0,0)$ of the pixel block bk(0,0). The S1 processor 16 sets the intermediate data of one pixel at a position set in advance among the four pixels p(0,0), p(1,0), p(0,1), and p(1,1), as the representative value. The S1 processor 16 adopts the intermediate data of one pixel, for example, positioned at a corner between the negative X-side and the negative 7-side in the pixel block, as the representative value. The S1 processor 16 adopts the intermediate data $S1_{p(0,0)}(d)$ of p(0, 0) as a representative value $S1_{bk(0,0)}(d)$ of the pixel block bk(0,0).

The S1 processor 16 determines a representative value $S1_{bk(0,1)}(d)$ of a pixel block bk(0,1) similar to the case of the pixel block bk(0,0). The pixel block bk(0,1) is provided with four pixels p(2,0), p(3,0), p(2,1), and p(3,1). The S1 processor 16 adopts an intermediate data $S1_{p(2,0)}(d)$ of p(2,0) as a representative value $S1_{bk(0,1)}(d)$ of the pixel block bk(0,1).

The S1 processor 16 may determine the representative value $S1_{bk}(d)$ lasing an arbitrary method. The S1 processor 16 may determine the intermediate data regarding a pixel at any position in the pixel block as the representative value $S1_{bk}(d)$. The S1 processor 16 may obtain any one of an intermediate value, an average value, a maximum value or the minimum value of the cost "S1" of a pixel included in a pixel block for each disparity value "d", and then, determine the obtained result as the representative value $S1_{bk}(d)$ of the pixel block.

The S1 arithmetic unit 7 outputs the representative value $S1_{bk}(d)$ calculated by the S1 processor 16. The output buffer 11 transmits the representative value $S1_{bk}(d)$ to the DRAM 2 via the bus 3. The DRAM 2 holds the representative value $S1_{bk}(d)$ for each pixel block.

The image recognition apparatus 1 calculates one representative value $S1_{bk}(d)$ with respect to the plurality of pixels in the pixel block. The image recognition apparatus 1 saves the representative value $S1_{bk}(d)$, which is calculated for each pixel block, in the DRAM 2. The image recognition apparatus 1 reduce a size of data to be saved as compared to that of a case in which the entire intermediate data obtained for each pixel of the input image is saved in the DRAM 2.

The S1 buffer 9 temporarily stores the representative value $S1_{bk}(d)$ read from the DRAM 2 for each pixel block. The S1 restoration unit 10 restores the intermediate data for each pixel within the pixel block based on the representative value $S1_{bk}(d)$ read from the S1 buffer 9. The S1 restoration unit 10 calculates restoration data $S1(d)'$ using the representative value $S1_{bk}(d)$.

The S1 restoration unit 10 calculates restoration data $S1_{p(0,0)}(d)'$, $S1_{p(1,0)}(d)'$, $S1_{p(0,1)}(d)'$, and $S1_{p(1,1)}(d)'$ of the four pixels p(0,0), p(1,0), p(0,1), and p(1,1) based on the representative value $S_{bk(0,0)}(d)$ of the pixel block bk(0,0). The S1 restoration unit 10 applies the common representative value $S_{bk(0,0)}$, for example, as the restoration data $S1_{p(0,0)}(d)'$, $S1_{p(1,0)}(d)'$, $S1_{p(0,1)}(d)'$, and $S1_{p(1,1)}(d)'$.

The S1 restoration unit 10 calculates restoration data $S1_{p(2,0)}(d)'$, and so on of the four pixels p(2,0), p(3,0), p(2,1), and p(3,1) of the pixel block bk(0,1) similar to the case of the pixel block bk(0,0).

The S1 restoration unit 10 reads the representative value $S1_{bk}(d)$ as data for each pixel of the pixel block from the S1 buffer 9 and expands the restoration data. The S1 buffer 9 holds $S1_{bk}(d)$ as the data for each pixel of the pixel block, for example. The S1 buffer 9 may hold $S1_{bk}(d)$ as the data for each pixel block. The S1 restoration unit 10 may be capable of reading $S1_{bk}(d)$ with respect to each pixel within the same pixel block by access to the same memory region of the S1 buffer 9.

The S1 restoration unit 10 may calculate the restoration data $S1(d)$ using an arbitrary method based on $S1_{bk}(d)$. The S1 restoration unit 10 may calculate the restoration data of each pixel by interpolation processing of representative values of pixel blocks adjacent to each other.

When $S2(d)$ is calculated, the S arithmetic unit 6 adds $S2(d)$ to the restored intermediate data $S1(d)'$. The S arithmetic unit 6 calculates S(d) regarding the target pixel by adding $S1(d)'$ and $S2(d)$ regarding the target pixel. The S arithmetic unit 6 calculates $S_p(d)$ regarding the pixel p by Expression (5).

$$S_p(d)=S1_p(d)'+S2_p(d) \qquad (5)$$

The image recognition system is capable of reducing the amount of data to be stored in the DRAM 2, and thus, reduction in memory capacity of the DRAM 2 is possible. In addition, the image recognition system is capable of reducing the amount of data to be transferred the image recognition apparatus 1 and the DRAM 2, and thus, reduction in bandwidth of the bus 3 is possible. The image recognition system is capable of reducing manufacturing cost by the reduction in the memory capacity of the DRAM 2 and the reduction in the bandwidth of the bus 3.

In addition, the image recognition apparatus 1 searches the disparity value without thinning out the disparity values in the search range. The image recognition apparatus 1 is capable of searching the disparity value with which the cost is the minimum from all the disparity values set in the search range. The image recognition apparatus 1 is capable of decreasing the number of pixels for which each disparity value obtained as the search result is determined to be invalid.

Figure 7:
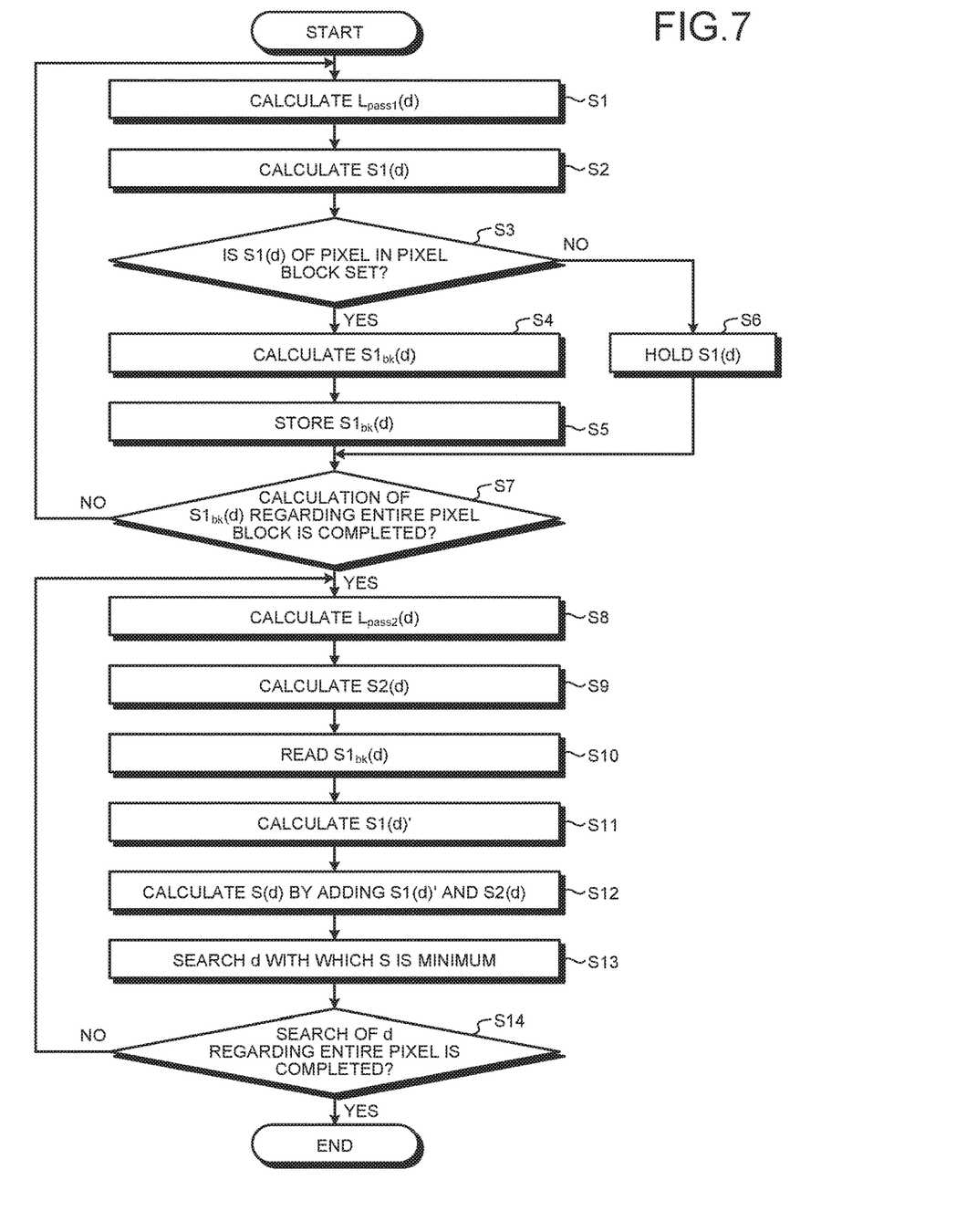
FIG. 7 is a flowchart illustrating a procedure of the image processing method of the first embodiment.

FIG. 7 is a flowchart illustrating a procedure of the image processing method of the first embodiment. The image recognition apparatus 1 performs a process according to a first step regarding the first path group and a process according to a second step regarding the second path group during the search of the disparity value for each pixel of the input image. The image recognition apparatus 1 executes processes S1 to S7 by scanning the pixel data along the first pass as the first step.

The L arithmetic unit 5 calculates $L_{pass1}(d)$ (S1). The cost function $L_{pass1}(d)$ is the cost function L(d) regarding the first path group. The cost function $L_{pass1}(d)$ includes $L_{r0}(d)$, $L_{r1}(d)$, $L_{r2}(d)$, and $L_{r3}(d)$ regarding the four paths r0, r1, r2, and r3.

The S arithmetic unit 6 calculates $S1(d)$ (S2). The cost function $S1(d)$ is the addition result of $L_{r0}(d)$, $L_{r1}(d)$, $L_{r2}(d)$, and $L_{r3}(d)$ regarding the first path group. The block buffer 15 holds $S1(d)$ calculated for each pixel of the input image.

The S1 processor 16 determines whether the $S1(d)$ for each pixel in the pixel block is set in the block buffer 15 (S3). In a case in which $S1(d)$ for each pixel in the pixel block is not set (S3, No), the block buffer 15 holds $S1(d)$ until the $S1(d)$ for each pixel in the pixel block is set (S6).

In a case in which $S1(d)$ for each pixel in the pixel block is set (S3, Yes), the S1 processor 16 calculates the representative value $S1_{bk}(d)$ of the pixel block based on $S1(d)$ read from the block buffer 15 (S4). The S1 processor 16 transmits the calculated $S1_{bk}(d)$ to the DRAM 2 from the output buffer 11 via the bus 3. The S1 processor 16 stores $S1_{bk}(d)$ in the DRAM 2 (S5).

The S1 processor 16 determines whether the calculation of $S1_{bk}(d)$ is completed for all the pixel blocks of the input image (S7). In a case in which the calculation of(d) is not completed (S7, No), the image recognition apparatus 1 executes the processes from S1 with respect to a pixel for it $S1_{bk}(d)$ is not calculated.

In a case in which the calculation of $S1(d)$ is completed (S7, Yes), the image recognition apparatus 1 executes processes subsequent to S8 by scanning the pixel data in the second pass as the second step. The IL arithmetic unit 5 calculates $L_{pass2}(d)$ (S8). The cost function $L_{pass2}(d)$ is the cost function L(d) regarding the second path group. The cost function $L_{pass2}(d)$ includes $L_{r4}(d)$, $L_{r5}(d)$, $L_{r6}(d)$, and $L_{r7}(d)$ regarding the four paths r4, r5, r6, and r7.

The S arithmetic unit 6 calculates $S2(d)$ (S9). The cost function $S2(d)$ is the addition result $L_{r4}(d)$, $L_{r5}(d)$, $L_{r6}(d)$, and $L_{r7}(d)$ regarding the second path group.

The image recognition apparatus 1 reads the representative value $S1_{bk}(d)$ regarding the pixel for which $S2(d)$ is calculated from the DRAM 2 (S10). The S1 buffer 9 temporarily holds the read representative value $S1_{bk}(d)$. The S1 restoration unit 10 calculates the restoration data $S1(d)'$ based on the representative value $S1_{bk}(d)$ (S11).

The S arithmetic unit 6 calculates S(d) regarding the eight paths r0, . . . , r7 (S12) by adding the restoration data $S1(d)$ calculated in S11, and $S2(d)$ calculated in S9. The search unit 8 searches the disparity value "d" with which the sum "S" of the costs is the minimum from S(d) (S13). The search unit 8 transmits the disparity value "d", which is the search result, to the DRAM 2 from the output buffer 11 via the bus 3. The search unit. 8 stores the disparity value "d" in the DRAM 2.

The search unit 8 determines whether the search of the disparity value "d" for all the pixels of the input image is completed (S14) in a case in which the search of the disparity value "d" is not completed (S14, No), the image recognition apparatus 1 executes the processes from S8 with respect to a pixel for which the search of the disparity value "d" is not completed. The image recognition apparatus 1 ends the process in a case in which the search of the disparity value "d" is completed (S14, Yes).

The plurality of paths is not limited to a case in which the eight paths are provided it may be enough when the plurality of paths includes the first path group which is a target to be processed in the first step, and the second path group which is a target to be processed in the second step. The number of the paths may be changed as appropriate. The pixel block to be set is not limited to the pixel block of 2×2, but may be a pixel block having an arbitrary size (number of pixels).

According to the first embodiment, the image recognition apparatus 1 calculates the representative value of the intermediate data with respect to the pixel included in the pixel block. The image recognition apparatus 1 reduces the amount of data to be saved as compared to a case in which the entire intermediate data obtained for each pixel of the input image is saved in the DRAM 2. Therefore, it is possible to obtain an effect of reducing the size of data to be transferred and stored between steps according to the image recognition apparatus 1.

Second Embodiment

Figure 8:
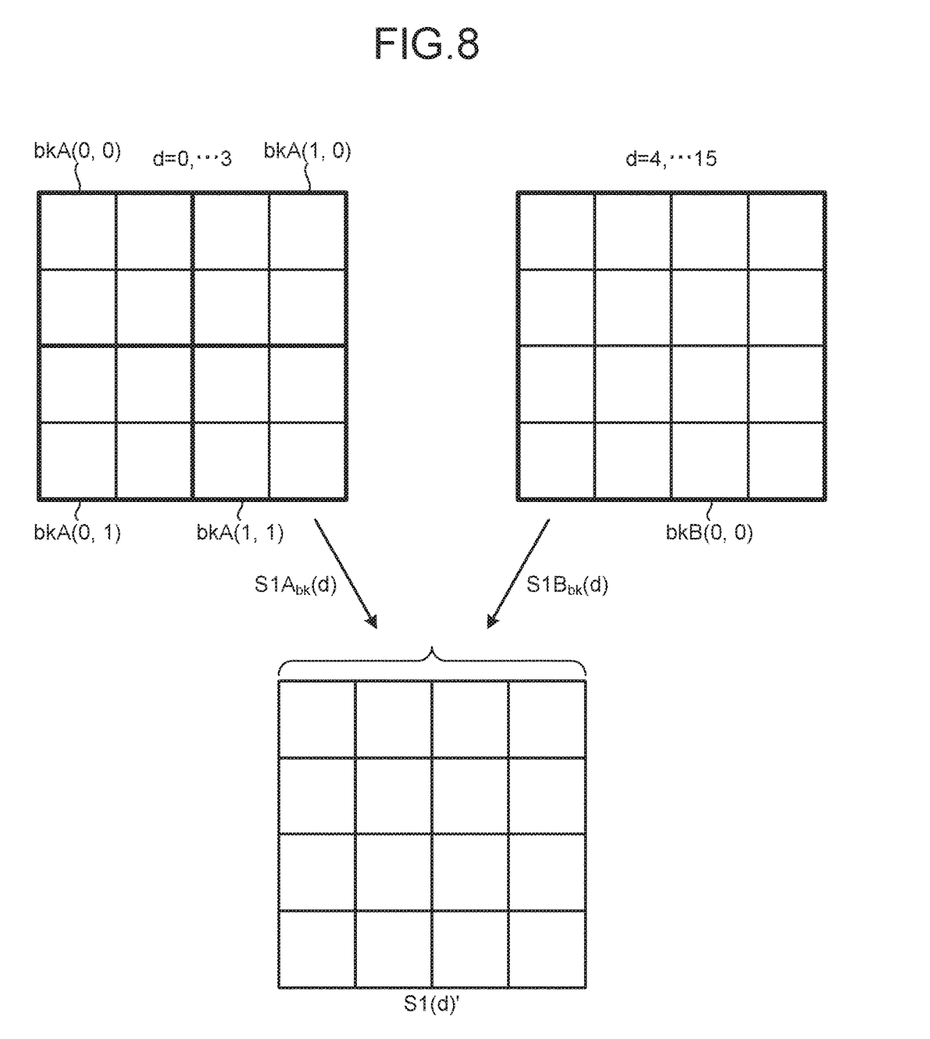
FIG. 8 is a diagram describing an image processing method of a second embodiment.

FIG. 8 is a diagram describing an image processing method of a second embodiment. The same parts as those of the first embodiment are attached by the same reference numerals, and redundant descriptions thereof will be omitted as appropriate. FIG. 8 is an explanatory diagram regarding calculation of a representative value in the S1 arithmetic unit 7.

In the second embodiment, a search range is set to a range with the disparity value "d" being 0 to 15. The S1 arithmetic unit 7 sets a pixel block of 2×2 as a first pixel block regarding a first range in which "d" is from 0 to 3 in the search range. The S1 arithmetic unit 7 sets a pixel block of 4×4 as a second pixel block regarding a second range in which "d" is −1 to 15 in the search range. The first pixel block regarding the first range, and the second pixel block regarding the second range are set in advance.

Incidentally, the search range is not limited to the range with the disparity value "d" being 0 to 15. The search range may be a narrower or wider range than "from 0 to 15". The search range may be a range including the disparity value "d" of a negative value. For example, the search range may be a range with the disparity value "d" being −16 to 15. For example, the first range may be a range in which "d" is −4 to 4, and the second range may be a range in which "d" is −16 to −5, and 5 to 15, in the search range. An absolute value of the disparity value of the first range is smaller than an absolute value of the disparity value of the second range.

The S1 arithmetic unit 7 sets a pixel block bkA of 2×2 regarding the disparity value of the first range. The S1 arithmetic unit 7 sets four pixel blocks bkA (0,0), bkA (1,0), bkA (0,1), and bkA (1,1) in a range of pixels of, for example, 4×4. The S1 arithmetic unit 7 calculates a representative value $S1A_{bk}(d)$ for each pixel block bkA regarding the disparity value of the first range.

The S1 arithmetic unit 7 sets a pixel block bkB of 4×4 regarding the disparity value of the second range. The S1 arithmetic unit 7 sets one pixel block bkB(0,0) in a range of pixels of 4×4. The S1 arithmetic unit 7 calculates a representative value $S1B_{bk}(d)$ for the pixel block bkB regarding the disparity value of the second range.

The S1 arithmetic unit 7 transfers the representative values $S1A_{bk}(d)$ and $S1B_{bk}(d)$ to the DRAM 2. The S1 restoration unit 10 calculates restoration data $S1(d)'$ regarding the disparity value of the first range based on the representative value $S1A_{bk}(d)$. The S1 restoration unit 10 calculates restoration data $S1(d)'$ regarding the disparity value of the second range based on the representative value $S1B_{bk}(d)$. In this manner, the S1 restoration unit 10 calculates restoration data $S1(d)'$ regarding each pixel.

In a range of the search range in which an absolute value of the disparity value is small, deviation of search of one pixel greatly influences the distance information with respect to a subject present at a long distance from a viewpoint at the time of photographing. The S1 arithmetic unit 7 sets the number of pixels of the pixel block to be small in the first range in which the absolute value of the disparity value is small, and accordingly, it is possible to search the disparity value with a high accuracy.

On the other hand, the influence of the deviation of search of one pixel on the distance information is relatively small in a range in which an absolute value of the disparity value is large. The S1 arithmetic unit. 7 sets the number of pixels of the pixel block to be large in the second range, and accordingly, it is possible to reduce the size of data to be saved in the DRAM 2 whale maintaining a search accuracy of the disparity value to some extent.

The number of pixels of the first pixel block and the number of pixels of the second pixel block are not limited to the case of being 4 and 16, respectively, but may be changed as appropriate. It may be enough when the number of pixels of the first pixel block and the number of pixels of the second pixel block are numbers different from each other in a case in which the absolute value of the disparity value of the first range is smaller than the absolute value of the disparity value of the second range, the number of pixels of the first pixel block is smaller than the number of pixels of the second pixel block.

The S1 arithmetic unit 7 is not limited to the configuration in which the disparity of the search range are divided into the two ranges, and the pixel blocks with the different numbers of pixels are set with respect to the two ranges. The S1 arithmetic unit 7 may divide the disparity values of the search range into three or more ranges, and set pixel blocks with the different numbers of pixels for the respective ranges.

The S1 arithmetic unit 7 does not necessarily set a pixel block for one range that has the smallest absolute value of the disparity value among a plurality of ranges divided from the search range. The S1 arithmetic unit 7 may transmit intermediate data for each pixel to the DRAM 2 regarding the corresponding one range. The S1 arithmetic unit 7 is capable of reducing the size of data to be transferred and stored between steps by setting the pixel block of an arbitrary range in the search range.

According to the second embodiment, the image recognition apparatus 1 reduces the amount of data to be saved in the DRAM 2 by calculating the representative value of the intermediate data for each pixel block. The image recognition apparatus 1 is capable of searching the disparity value with the high accuracy in the first range by setting the number of pixels of the first pixel block to be smaller than the number of pixels of the second pixel block. In this manner, the image recognition apparatus 1 is capable of reducing the size of data to be transferred and stored between steps, and further, searching the disparity value with the high accuracy.

Third Embodiment

Figure 9:
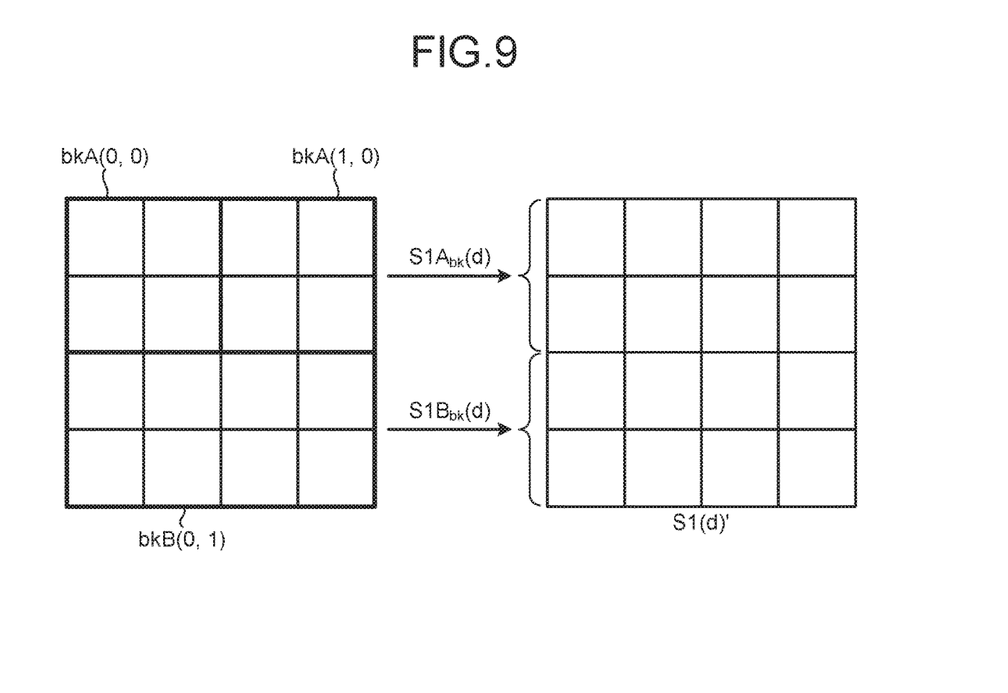
FIG. 9 is a diagram describing an image processing method of a third embodiment.

FIG. 9 is a diagram describing an image processing method of a third embodiment. The same parts as those of the first embodiment are attached by the same reference numerals, and redundant descriptions thereof will be omitted as appropriate. FIG. 9 is an explanatory diagram describing calculation of the representative value in the S1 arithmetic unit 7.

In the third embodiment, the S1 arithmetic unit 7 selects a size of a pixel block in response to S1($d$) which is the intermediate data calculated by the S arithmetic unit 6. The S1 arithmetic unit 7 selects any one of block sizes of, for example, 2×2, 2×4, 4×2 and 4×4. The S1 arithmetic unit 7 dynamically changes the size of the pixel block in response to a difference value of the intermediate data.

The S1 arithmetic unit 7 calculates a difference value of the sum "S1" of the costs for each disparity value regarding pixels in a pixel block every time the intermediate data for the pixel block of each size is set. The S1 arithmetic unit 7 sets the pixel block having a maximum block size in which the difference value is equal to or smaller than a threshold value set in advance.

For example, the S1 arithmetic unit 7 calculates an absolute difference value of "S1" regarding all disparity values of the search range. The S1 arithmetic unit 7 may calculate the absolute difference value of "S1" regarding disparity values of the search range with which "S1" is the minimum value and a value close to the minimum value.

For example, the S1 arithmetic unit 7 calculates the difference value for each block size with respect to the pixels of 4×4 illustrated in FIG. 9. Pixel blocks bkA(0,0) and bkA(1,0) are pixel blocks bkA to be set in a case in which the maximum block size in which the calculated difference value is equal to or smaller than the threshold value is 2×2. The S1 arithmetic unit 7 calculates a representative value S1A$_{bk}$(d) for each pixel block bkA regarding all the disparity values of the search range.

A pixel block bkB(0,1) is a pixel block bkB to be set in a case in which the maximum block size in which the calculated difference value is equal to or smaller than the threshold value is 2×4. The S1 arithmetic unit 7 calculates a representative value S1B$_{bk}$(d) for each pixel block bkB regarding all the disparity values of the search range.

The S1 arithmetic unit 7 transfers the representative values S1A$_{bk}$(d) and S1B$_{bk}$(d) to the DRAM 2. The S1 restoration unit 10 calculates restoration data S1($d$) regarding each pixel in the pixel blocks bkA(0,0) and bkA(1,0) based on the representative value S1A$_{bk}$(d). The S1 restoration unit 10 calculates restoration data S1($d$)' regarding each pixel in the pixel block bkB(0,1) based on the representative value S1B$_{bk}$(d) In this manner, the S1 restoration unit 10 calculates restoration data S1($d$) T regarding each pixel.

The S1 arithmetic unit 7 may impart a flag that represents a size of a pixel block for each calculated represent value. The S1 restoration unit 10 calculates the restoration data S1($d$) based on a representative value with respect to each pixel included in the pixel block size represented by the flag assigned to the representative value.

The S1 arithmetic unit 7 determines that the cost functions S1($d$) of respective pixels in the pixel block are similar to each other in the entire search range or in the range of the disparity value with which "S1" is close to the minimum value when the difference value is equal to or smaller than the threshold value. The S1 arithmetic unit 7 dynamically sets the pixel block having the maximum size, in which S1($d$) is determined to be similar, in the input image. The image recognition apparatus 1 is capable of searching the disparity value with the high accuracy and further reducing the data size by enlarging the size of the pixel block in a part in which the influence of the disparity value on the search accuracy is little.

The size of the pixel block is not limited to the case of being changed among the four block sizes described in the third embodiment. Each block size is not limited to the size described in the third embodiment, but may be changed as appropriate it is enough when the size of the pixel block is changed at least among a plurality of block sizes. The S1 arithmetic unit 7 may set the pixel blocks having different sizes for the respective ranges of the disparity values of the search range by combining the third embodiment with the second embodiment.

According to the third embodiment, the image recognition apparatus 1 reduces the amount of data to be saved in the DRAM 2 by calculating the representative value of the intermediate data for each pixel block. The image recognition apparatus 1 is capable of searching the disparity value with the high accuracy and reducing the data size by setting the pixel block having the maximum block size in which the difference value of the intermediate data is equal to or smaller than the threshold value. In this manner, the image recognition apparatus 1 is capable of reducing the size of data to be transferred and stored between steps, and further, searching the disparity value with the high accuracy.

Fourth Embodiment

Figure 10:
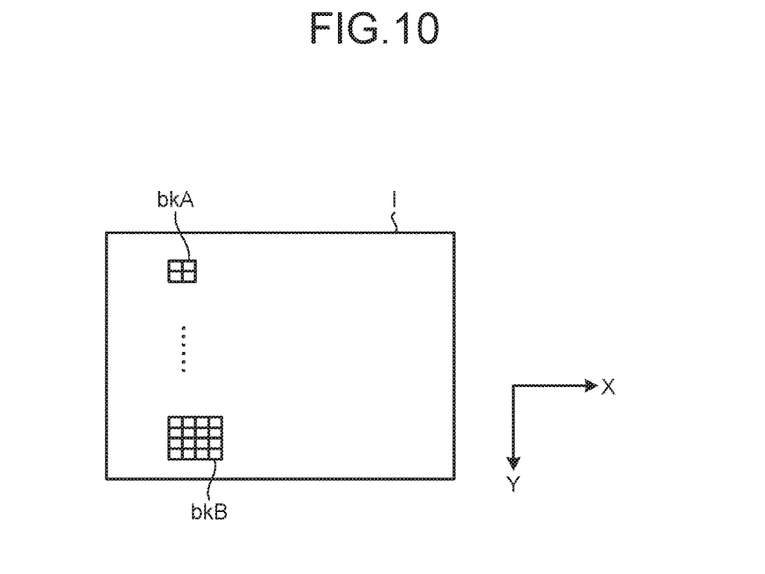
FIG. 10 is a diagram describing an image processing method of a fourth embodiment.

FIG. 10 is a diagram describing an image processing method of a fourth embodiment. The same parts as those of the first embodiment are attached by the same reference numerals, and redundant descriptions thereof will be omitted as appropriate. FIG. 10 is an explanatory diagram regarding setting of the pixel block in the input image I.

In the fourth embodiment, the S1 arithmetic unit. 7 sets pixel blocks having the number of pixels different from each other in response to positions in the input image I. For example, the S1 arithmetic unit 7 sets a pixel block bkA of 2×2 which is a first pixel block in a range on the negative Y-side than the center of the input image I. The S1 arithmetic unit 7 sets a pixel block bkB of 4×4 which is a second pixel block in a range on the positive Y-side than the center of the input image I.

The region on the negative Y-side than the center of the input image I is a region in which a subject present relatively far from a viewpoint at the time of photographing is assumed to be imaged. The image recognition apparatus 1 is capable of searching the disparity value with the high accuracy with respect to the far subject by decreasing the number of pixels of the pixel block in such a region.

On the other hand, the region on the positive Y-side than the center of the input image I is a region in which a subject present relatively close to a viewpoint at the time of photographing is assumed to be imaged. The image recognition apparatus 1 is capable of reducing the size of data to be saved in the DRAM 2 while maintaining the search accuracy of the disparity value to some extent by increasing the number of pixels of the pixel block in such a region.

The S1 arithmetic unit 7 is not limited to the configuration in which the two arbitrary pixel blocks having the number of pixels different from each other are set in the input image I. The S1 arithmetic unit 7 may set three or more arbitrary pixel blocks having different numbers of pixels in the input image I. Each block size is not limited to the size described in the fourth embodiment, but may be changed as appropriate. The pixel block is not limited to the case of being determined in advance with respect to the region of the input image I. The size of the pixel block and the region to which the pixel block is set may be changed by setting a parameter or the like.

The S1 arithmetic unit 7 may set the pixel blocks having different sizes for the respective ranges of the disparity values of the search range by combining the fourth embodiment with the second embodiment. The S1 arithmetic unit 7 may change the size of the pixel block set in response to the position in the input image I by combining the fourth embodiment with the third embodiment.

According to the fourth embodiment, the image recognition apparatus 1 reduces the amount of data to be saved in the DRAM 2 by calculating the representative value of the intermediate data for each pixel block. The image recognition apparatus 1 is capable of searching the disparity value with the high accuracy and reducing size by setting the pixel blocks having the number of pixels different from each other in response to the positions in the input image. In this manner, the image recognition apparatus 1 is capable of reducing the size of data to be transferred and stored between steps, and further, searching the disparity value with the high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured to:
calculate a first cost function of a first image and a second image using the first image as a reference, the first image and the second image being acquired by being photographed from different viewpoints, the first cost function representing a relation between a disparity value and a cost, the relation being a relation in a search range of a corresponding point of the second image with a target pixel of the first image, the cost being a result of evaluating a degree of difference between pixel data of the target pixel and pixel data of the disparity value, the first cost function depending on the cost of a pixel on a path heading toward the target pixel;
calculate a second cost function which is a sum of first cost functions regarding a plurality of paths heading toward the target pixel;
calculate a representative value of intermediate data which is an addition result of first cost functions regarding a first path group of the plurality of paths with respect to pixels included in a pixel block of the first image;
search a disparity value representing the corresponding point of the second image from the second cost function; and
add first cost functions regarding a second path group of the plurality of paths to intermediate data restored from a common representative value regarding the pixels included in the pixel block.

2. The image processing apparatus according to claim 1, wherein
the processor sets one of the intermediate data regarding the pixels included in the pixel block as the representative value.

3. The image processing apparatus according to claim 1, wherein
the representative value is any one of an intermediate value, an average value, a maximum value, or a minimum value of a cost of the pixels included in the pixel block.

4. The image processing apparatus according to claim 1, wherein
the processor calculates restoration data which is intermediate data restored from the representative value regarding the pixels included in the pixel block, and
the processor sets a common representative value as the restoration data.

5. The image processing apparatus according to claim 1, wherein
the processor calculates restoration data which is intermediate data restored from the representative value regarding the pixels included in the pixel block, and
the processor calculates the restoration data by interpolation processing of the representative value.

6. The image processing apparatus according to claim 1, wherein
the processor calculates a difference value of the intermediate data of pixels in a pixel block regarding a plurality of pixel blocks having different numbers of pixels, and selects any one of the plurality of pixel blocks in response to the difference value.

7. The image processing apparatus according to claim 6, wherein
the processor sets a pixel block in which the difference value is equal to or smaller than a threshold value, and a number of pixels is a maximum.

8. The image processing apparatus according to claim 1, wherein the processor sets pixel blocks having different numbers of pixels in response to positions of pixel blocks in the first image.

9. The image processing apparatus according to claim 1, wherein
the processor applies a pixel block set in advance to the entire first image.

10. The image processing apparatus according to claim 1, wherein
the processor applies a pixel block set in advance regarding disparity values of the entire search range.

11. The image processing apparatus according to claim 1, wherein the pixel block includes one pixel.

12. An image processing apparatus comprising:
a processor configured to:
calculate a first cost function of a first image and a second image using the first image as a reference, the first image and the second image being acquired by being photographed from different viewpoints, the first cost function representing a relation between a disparity value and a cost, the relation being a relation in a search range of a corresponding point of the second image with a target pixel of the first image, the cost being a result of evaluating a degree of difference between pixel data of the target pixel and pixel data of the disparity value, the first cost function depending on the cost of a pixel on a path heading toward the target pixel;

calculate a second cost function which is a sum of first cost functions regarding a plurality of paths heading toward the target pixel;

calculate a representative value of intermediate data which is an addition result of first cost functions regarding a first path group of the plurality of paths with respect to pixels included in a pixel block of the first image;

search a disparity value representing the corresponding point of the second image from the second cost function;

calculate the representative value regarding pixels included in a first pixel block with respect to disparity values of a first range of the search ranges; and calculate the representative value regarding pixels included in a second pixel block with respect to disparity values of a second range of the search range, the number of pixels of the first pixel block being different from the number of pixels of the second pixel block.

13. The image processing apparatus according to claim 12, wherein
an absolute value of a disparity value of the first range is smaller than an absolute value of a disparity value of the second range, and the number of pixels of the first pixel block is smaller than the number of pixels of the second pixel block.

14. An image processing method of an image processing apparatus, wherein the apparatus comprises a processor, the method comprising:

calculating, by the processor, a first cost function of a first image and a second image using the first image as a reference regarding a first path group among a plurality of paths, the first image and the second image being acquired by being photographed from different viewpoints, the first cost function representing a relation between a disparity value and a cost, the relation being a relation in a search range of a corresponding point of the second image with a target pixel of the first image, the cost being a result of evaluating a degree of difference between pixel data of the target pixel and pixel data of the disparity value, the first cost function depending on the cost of a pixel on a path heading toward the target pixel;

calculating, by the processor, a representative value of intermediate data which is an addition result of first cost functions regarding the first path group with respect to pixels included in a pixel block of the first image;

calculating, by the processor, a first cost function of the target pixel regarding a second path group among the plurality of paths;

calculating, by the processor, a second cost function which is a sum of first cost functions regarding the plurality of paths; and searching, by the processor, a disparity value representing the corresponding point of the second image from the second cost function; wherein intermediate data is restored from a common representative value regarding the pixels included in the pixel block, and the second cost function is calculated by adding first cost functions regarding the second path group to the restored intermediate data.

15. The image processing method according to claim 14, wherein
one of the intermediate data regarding the pixels included in the pixel block is set as the representative value.

16. The image processing method according to claim 14, wherein
the representative value is calculated regarding pixels included in a first pixel block with respect to disparity values of a first range of the search range, the representative value is calculated regarding pixels included in a second pixel block with respect to disparity values of a second range of the search range, and a number of pixels of the first pixel block is different from a number of pixels of the second pixel block.

17. The image processing method according to claim 16, wherein
an absolute value of a disparity value of the first range is smaller than an absolute value of a disparity value of the second range, and the number of pixels of the first pixel block is smaller than the number of pixels of the second pixel block.

18. The image processing method according to claim 14, wherein
a difference value of the intermediate data is calculated regarding pixels in a pixel block regarding a plurality of pixel blocks having different numbers of pixels, and any one of the plurality of pixel blocks is selected in response to the difference value.

19. The image processing method according to claim 14, wherein pixel blocks having different numbers of pixels are set in response to positions of pixel blocks in the first image.

* * * * *